CONTINUOUS PROCESS FOR PRODUCING SEMICONDUCTOR DEVICES

Filed April 20, 1959 2 Sheets-Sheet 1

WITNESSES
Wm. B. Sellers.
Charles L. Menzemer

INVENTORS
Harold John, Allan I. Bennett
and Richard L. Longini.
BY
Frederick Shapoe
ATTORNEY

United States Patent Office 3,106,764

Patented Oct. 15, 1963

3,106,764

CONTINUOUS PROCESS FOR PRODUCING SEMICONDUCTOR DEVICES

Richard L. Longini, Allan I. Bennett, Jr., and Harold F. John, Pittsburgh, Pa., assignors to Westinghouse Electric Corporation, East Pittsburgh, Pa., a corporation of Pennsylvania Filed Apr. 20, 1959, Ser. No. 807,570
6 Claims. (Cl. 29—25.3)

This invention relates to a continuous process for preparing semiconductor devices.

At the present time crystals of semiconductive materials, for example silicon, germanium and stoichiometric compounds of groups III and V and groups II and VI elements, are produced by preparing a melt of the solid material, contacting the surface of the melt with a previously prepared crystal of the material and slowly withdrawing the previously prepared crystal, whereby to produce a desired grown crystal member.

The nature and configuration of the withdrawn crystals by such prior art practices have generally been uncontrolled except within relatively broad limits. Thus, the thickness has not been readily maintained within precise dimensions and in many cases imperfections and flaws have been present in the grown crystals.

In order to employ such crystals in semiconductor devices, it has been necessary to saw them into slices or wafers using, for example, diamond saws. Thereafter, dice of a desired shape have been cut from the slices. The sawed surfaces of the dice have been lapped or otherwise mechanically polished to remove disturbed or otherwise unsatisfactory surface layers, which treatment is followed by an etch to remove microscopic surface imperfections.

The dice are then doped individually in accordance with the procedures known to those skilled in the art and contacts and leads affixed to each individual small dice to form the desired semiconductor device.

This laborious procedure is time consuming, requires highly-skilled labor and results in many unsatisfactory devices as a result of mistakes or poor workmanship.

An object of the present invention is to provide a method of continuously preparing semiconductor devices comprising doping a surface of an elongated dendritic strip of a predetermined length of a semiconductor material with a doping impurity of a given type of semiconductivity, applying contacts and leads to the doped strip, and severing the strip to produce a plurality of semiconductive devices.

Other objects of the present invention will, in part, be obvious and will, in part, appear hereinafter.

For a better understanding of the nature and objects of the invention, reference should be had to the following detailed description and drawings in which:

FIG. 1 is a view in elevation partly in section of a crystal growing apparatus;

FIGS. 2 to 4 inclusive are side views in cross-section of fragments of crystals of a semiconductive material at various stages of the process of this invention, FIGS. 5 to 7 inclusive are side views in cross-section of semiconductive devices at various stages of the process of this invention;

FIG. 8 is a schematic view in diagrammatic form illustrating one convenient method of preparing semiconductive devices in accordance with this invention;

FIGS. 9 to 11 inclusive are side views in cross section of fragments of crystals of a semiconductive material at various stages of the process of this invention;

Figure 1:
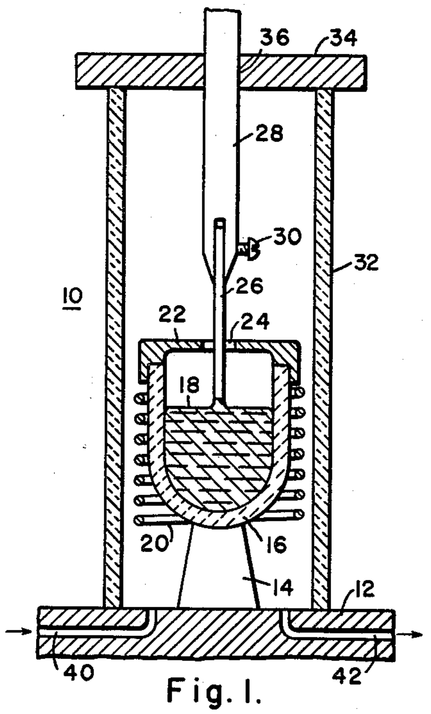

In accordance with the present invention and attainment of the foregoing objects there is provided a method of continuously preparing semiconductor devices comprising doping a surface of an elongated strip comprising a dendrite of a semiconductive material with a doping impurity to yield a given type of semiconductivity, applying ohmic contacts at predetermined intervals along the strip to the doped surface, applying ohmic contacts to the opposite surface of the strip, and severing the strip at points intermediate to the predetermined intervals to produce a plurality of devices.

The elongated strip of a dendritic semiconductive starting material may be prepared in any suitable manner. A preferred manner is set forth in U.S. patent application, Serial Number 757,832, now abandoned, the assignee of which is the same as in the present application, and reference should be made thereto for details. Briefly, however, and with reference to FIG. 1 of the drawings, there is illustrated apparatus 10 suitable for use in accordance with the teachings of this invention. The apparatus 10 comprises a base 12 carrying a support 14 for a crucible 16 of a suitable refractory materail such as graphite to hold a melt of the material from which flat dendritic crystals are to be drawn. Molten material 18, for example, doped germanium, is maintained within the crucible 16 in the molten state by a suitable heating means such, for example, as an induction heating coil 20 disposed about the crucible. Controls, not shown, are employed to supply alternating electrical current to the induction coil 20 to maintain a closely controlled temperature in the body of the melt 18. The temperature should be readily controllable to provide a temperature in the melt a few degrees above the melting point and also to reduce heat input so that the temperature drops in a few seconds, for example in 5 to 15 seconds to a temperature at least one degree below the melting temperature and preferably to supercool the melt from 5 to 15° C., or lower. A cover 22 closely fitting the top of the crucible 16 may be provided in order to maintain a low thermal gradient above the top of the melt. Passing through an aperture 24 in the cover 22 is a seed crystal 26, preferably having a single twin plane and oriented crystallographically as is discussed in detail in U.S. patent application, Serial No. 757,832. The crystal 26 is fastened to a pulling rod 28 by means of a screw 30 or the like. The pulling rod 28 is actuated by suitable mechanism to control its upward movement at a desired uniform rate, ordinarily in excess of one inch per minute. A protective enclosure 32 of glass or other suitable material is disposed about the crucible with a cover 34 closing the top thereof except for an aperture 36 through which the pulling rod 28 passes.

Within the interior of enclosure 32 is provided a suitable protective atmosphere entering through a conduit 40 and, if necessary, a vent 42 may be provided for circulating a current of such protective atmosphere. Depending on the crystal material being processed in the apparatus, the protective atmosphere may comprise a noble gas such as helium or argon, or a reducing gas such as hydrogen or mixtures of hydrogen and nitrogen, or nitrogen or the like or mixtures of two or more gases. In some cases, the space around the crucible may be evacuated to a high vacuum in order to produce crystals of materials free from any gases.

In the event that the process is applied to compounds having one component with a high vapor pressure at the temperature of the melt, a separately heated vessel containing the component may be disposed in the enclosure 32 to maintain therein a vapor of such compound at a partial pressure sufficient to prevent impoverishing the melt or the grown crystals with respect to the component. Thus an atmosphere of arsenic may be provided when crystals of gallium arsenide are being pulled. The enclosure 32 may be suitably heated, for example, by an electrically heated cover, to maintain the walls thereof at a temperature above the temperature of the separately heated vessel containing the arsenic in order to prevent condensation of arsenic thereon.

The dendrite crystal 26 may be of any suitable length, depending on the pulling rod 28. Thus, dendritic crystals of from 4 to 30 inches in length have been readily drawn from the melt. As will be shown later, continuous lengths may be produced. These elongated dendritic crystals are not single crystals and have flat faces of 111 orientation and such faces are almost perfectly flat. The thickness of the dendrite crystals may be controlled to be from 3 to 20 mils, though thicknesses greater or lesser than these values may be obtatined. The width may vary from 0.020 to 0.200 inch or wider.

The dendrite crystals may be intrinsic when pulled from a melt of pure semiconductor material, or the melt 18 may be doped with p or n type doping impurities and a doped dendrite will be obtained.

The dentrite crystals may be employed in the preparation of semiconductor devices without any surface cutting, etching, lapping or other pre-treatment since the flat surfaces having 111 orientation approach perfection. The thickness of the dendrite crystal may vary slightly by flat steps of the order of 50 angstroms if the conditions during its growth vary. However, with reasonable control the dendrite crystal will vary less than 0.0001 inch in a length of 30 inches.

The edges of the dendritic crystals are saw-tooth shape, but this has been found to be insignificant in its effect on semiconductor devices produced therefrom.

The dendritic crystals are flexible and a crystal 7 mils in thicknes can be readily bent on a radius of 2 to 3 inches.

The dendritic crystals may be cut by scoring with a diamond to produce lengths or fragments suitable for processing into semiconductor devices.

Figure 2:
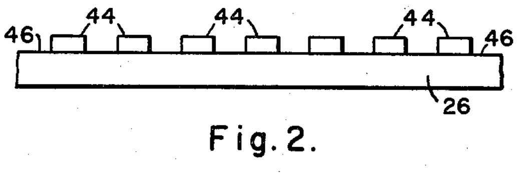

With reference to FIG. 2, there is illustrated a fragmentary section of the dentritic crystal 26 of FIGURE 1. For purposes of explanation it will be assumed that the dendrite is germanium having a p-type semiconductivity. A plurality of n-type doping alloy pellets 44 comprised of, for example, phosphorus, arsenic, antimony and mixtures and base alloys thereof are disposed upon surface 46 of the fragment of elongated crystal 26. The distance between the pellets 44 will depend primarily upon the end use of the devices to be produced. If the crystal is to be subsequently divided into a plurality of semiconductor devices, then for ease of separating the pellets should be about 20 mils apart. If however, it is desired to prepare an assembly comprised of a series of devices, as is commonly used in computers, then the pellets can be as close as 10 mils or less.

Figure 3:
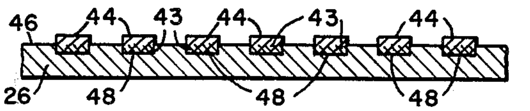

The assembly is then passed into a furnace and the alloying pellets fused to the elongated crystal and a p-n junction formed therein. FIG. 3 illustrates the assembly at this point of the procedure. The assembly is comprised of a fragment of p-type crystal 26 with n-type doping pellets 44 fused thereto, an area 43 of recrystallized germanium and doping material and a series of p-n junctions 48 within crystal 26.

The fusion of the pellets 44 to the crystal 26 is carried out in a vacuum, for example a vacuum of approximately $10^{-2}$ mm. Hg or better or in an inert atmosphere, for example an atmosphere of hydrogen or helium. The temperature at which the fusion is carried out will depend upon the materials involved. When the alloy thereof, for example indium, aluminum, and 99.9% gold 0.1% boron alloy, may be joined to the wafer 126 by fusion or soldering. Metal counterelectrodes can be joined to the ohmic contact region either during the original fusion step or in a subsequent separate step.

Figure 6:
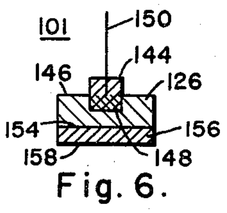

Member or diode 101, illustrated in FIG. 6, is a diode type semiconductor device. The diode 101 is comprised of a wafer of p-type germanium 126, an n-type doping pellet 144 fused to surface 146 of wafer 126, a p-n junction 148, a contact 150 and a p-type or neutral ohmic contact 156.

Figure 7:
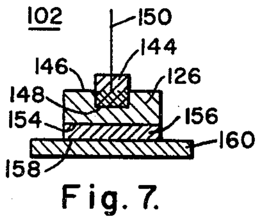

With reference to FIG. 7, a counterelectrode 160, which may be comprised of tungsten, molybdenum, tantalum and base alloys and combinations thereof with other suitable metals, for example nickel coated molybdenum, is joined to surface 158 of ohmic contact 156. The connection may be made by using the ohmic contact 156 itself as a solder or a separate solder may be used. The counterelectrode facilitates the affixing of lead contacts to the diode. The device 102, illustrated in FIG. 7, is now suitabel for use as a diode semiconductor device.

If the device 102 is to be used in electrical equipment in which good stability and lifetime are required, for example in a computer, certain additional fabrication steps may be required. For example, after the formation of the p-n junction 148, by fusing doping pellet 144 into wafer 126, it may be desirable to etch the surface 146 of wafer 126 to remove any excess doping material therefrom. The etching procedure followed is not critical and a chemical dip etch, for example, crystal is germanium a fusion temperature within the range of 200° C. to 600° C. has been found satisfactory. When the crystal is silicon a temperature of from 400° C. to 1000° C. has been found satisfactory. When the crystal is comprised of a group III—V or II—VI compound a temperature within the range of 200° C. to 1000° C. is satisfactory. The assembly should be cooled, to for example 200° C., before it passes from the vacuum or inert atmosphere.

Figure 4:
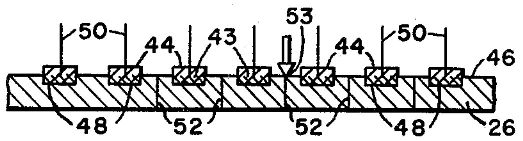

With reference to FIG. 4, contacts 50, comprised of any suitable metal, alloy or mixture, for example copper, nickel, aluminum, tin coated steel, gold coated nickel and the like, are affixed to the pellets 44. The contacts 50 may be inserted into the pellets 44 in the fusion furnace, while the pellets are soft, or the contacts may be soldered to the pellets 44 after the assembly is removed from the furnace.

Figure 5:
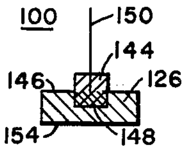

The assembly is scored along lines 52 by any suitable means, for example, with a diamond scribe 53, and divided into a plurality of members 100 as illustrated in FIG. 5.

The member 100 is comprised of a wafer 126 of a semiconductive material, a doping pellet 144 fused to surface 146 of wafer 126, and a p-n junction 148 disposed between wafer 126 and pellet 144.

With reference to FIG. 6, the assembly 100 of FIG. 5 is converted into a diode semiconductive device 101 by joining an ohmic contact 156 to surface 154 of wafer 126. The ohmic contact which may be comprised of any suitable p-type doping or neutral metal or base an etch comprising hydrofluoric acid and nitric acid to which may be added acetic acid may be used. In addition, the etching may be accomplished with an electrolytic etch, for example an etch comprising aqueous sodium hydroxide or potassium hydroxide or hydrofluoric acid in absolute ethyl alcohol. The current employed may vary from 10 milliamperes to approximately 5 amperes. It will be understood that if the etching is carried out after the affixing of contact 150 care must be taken to employ an etchant that will not attack the contact.

In addition to etching, the characteristic of the device 102 may also be improved by coating the surface about the p-n junction and thus preventing or at least substantially decreasing leakage currents. A preferred coating is one comprised of lead oxide ($Pb_3O_4$) or mercuric oxide (HgO) and a suitable resin, for example a silicone resin. Details pertaining to this coating are set forth in U.S. Patent 2,937,110, the assignee of which is the same as in the present application. In addition to the $Pb_3O_4$ or HgO-silicone resin coating, certain glassy coatings, such as arsenic sulfide-thallium sulfide eutectic mixtures have been found suitable. An air oxidation coating could also be used.

Various modifications may be made in the process described above. In one modification, the doping pellet, and the ohmic contact may be fused to the crystal of semiconductor material in one operation. The crystal can then be cut into a plurality of devices.

It is further contemplated that certain modifications and changes could be made in the process of this invention by the use of suitable jigging apparatus.

Figure 8:
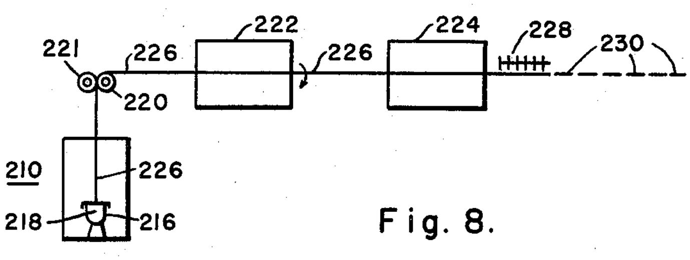

In addition while the above process has been described in terms of a fragment of a crystal prepared in the apparatus of FIG. 1, in a modification of this invention, a continuous crystal could be pulled and passed through the various fabrication steps set forth above. For example, and with reference to FIG. 8, a continuous crystal 226 could be pulled from a melt 218 held within a crucible 216 in a crystal pulling apparatus 210. The apparatus 210 is similar to apparatus 10 illustrated in FIG. 1. The suitably doped crystal 226 passes between driven pulling rollers 220 and 221 and into a furnace 222 in which spaced doping alloy pellets are fused thereto. The alloyed crystal passes into a second furnace 224 in which ohmic contacts and counterelectrodes are affixed thereto. The assembly then passes between a series of diamond scribes or saws 228 which cut the crystal into a series of individual semiconductor devices 230.

In still another modification of this invention semiconductor devices may be prepared by establishing a p-n junction within a doped crystal, pulled from the apparatus of FIG. 1, by diffusing a second doping impurity thereinto. For the purposes of clarity, the process will be described in terms of preparing a germanium diode. A p-type germanium crystal or a fragment thereof pulled with the apparatus illustrated in FIG. 1, is first passed into a diffusion furnace. The furnace is at a temperature within the range of 400° C. to 900° C. and has an atmosphere of a suitable n-type doping material, for example an arsenic, antimony or phosphorus atmosphere. The n-type impurity diffuses into the p-type crystal forming a p-n junction therein. Since the n-type impurity will diffuse through all sides of the crystal one of two approaches may be taken. The n-type impurity may be allowed to diffuse through all four sides of the crystals or three sides of the crystal may be masked so that the impurity is diffused through only one side of the crystal. Practical experience has taught that when the crystal is of germanium the best results are achieved when the impurity is allowed to diffuse through all four sides of the crystal. The crystal is then etched, for example with a mixture of nitric acid and hydrofluoric acid to remove the undesired n-type regions. When the crystal is comprised of silicon good results have been achieved by masking three sides of the crystal before diffusion. The masking may be accomplished by heating in an ambient air atmosphere at a temperature of 800° C. to 1000° C. whereby, a silicon oxide coating, which is impervious to diffusion of certain impurities is formed upon the surface of the crystal. The oxide may be removed from the surface through which the doping is to be carried out by etching, with for example hydrofluroic acid, or by abrasion, with, for example, silicon oxide.

Figure 9:
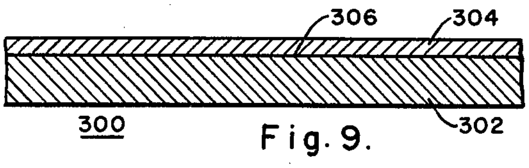

With reference to FIG. 9, there is illustrated a fragment 300 of a p-type germanium crystal which has been selectively doped with an n-type impurity. The fragment 300 is comprised of a p-type region 302 and an n-type region 304 with a p-n junction 306.

Figure 10:
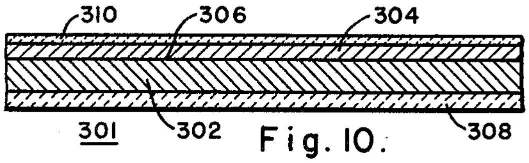

An ohmic contact 308 comprised of p-type or neutral doping material is then affixed either by soldering or alloying to p-type region 302. An n-type ohmic contact 310 is also affixed to region 304 by either soldering or alloying. The resulting structure 301 is shown in FIG. 10.

Figure 11:
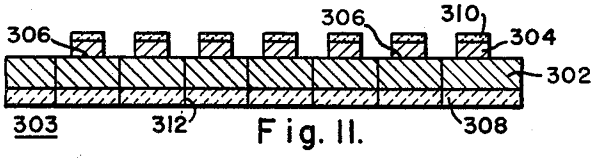

The n-type ohmic contact 310 and the n-type region 304 are then selectively etched, with for example an etch comprised of hydrofluroic acid and nitric acid to divide the structure 301 into a plurality of devices. The result structure 303 is shown in FIG. 11. The structure 303 is then scored along lines 312 with for example a diamond saw or scribe and separated into a plurality of devices.

Figure 12:
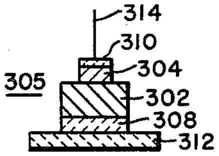
FIG. 12 is a side view in section of a semiconductive device prepared in accordance with the process of this invention.

With reference to FIG. 12, a counterelectrode 312 comprised of, for example tungsten, molybdenum, tantalum, nickel and base alloys thereof, is joined to the ohmic contact 308 in the same manner as described hereinabove, and a contact 314 is affixed to the ohmic contact 310. The resultant structure 305 is a diode type semiconductor device.

The device 305 may be etched or coated with for example a mixture of $Pb_3O_4$ and silicone resin to improve its electrical properties.

Figure 13:
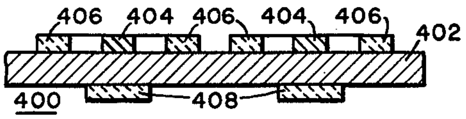
FIG. 13 is a side view in cross-section of a fragment of a crystal of a semiconductive material being processed in accordance with this invention.
Figure 14:
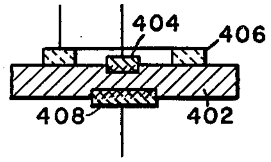
FIG. 14 is a side view in cross-section of a semiconductor device prepared in accordance with this invention.

The procedures described hereinabove for preparing a diode is also applicable for preparing a transistor type semiconductor device. For example and with reference to FIG. 13, a p-type germanium crystal 402 is produced in the apparatus of FIG. 1. Emitter n-type doping alley pellets 404 and p-type or neutral ohmic base contact rings 406 are disposed upon one surface of the crystal 402. N-type alloy collectors 408 are put out the lower surface. The assembly 400 is pased through a fusion furnace and fused into a unitary structure. Suitable leads are fastened thereto either in the fusion furnace or after fusion. The crystal is then scored and divided into a plurality of transistor type devices as illustrated in FIG. 14. The device may be etched or have the surfaces thereof coated as described above to improve its electrical characteristics.

The following examples are illustrative of the teachings of this invention.

*Example I*

In apparatus similar to FIG. 1, a graphite crucible containing a quantity of germanium and $1.5\times10^{-5}\%$ by weight, arsenic, is heated by the induction coil to a temperature several degrees above the melting point of germanium, the temperature being about 938° C., until the entire quantity forms a molten pool. A dendritic seed crystal having a single interior twin plane and oriented as in FIG. 2 of the drawing, held vertically in a holder is lowered until its lower end touches the surface of the molten germanium. The contact with the molten germanium is maintained until a small portion of the end of the dendritic seed crystal has melted. Thereafter the temperature of the melt is lowered rapidly in a matter of 5 seconds by reducing current to the coil 20, to a temperature 8° below the melting point of the germanium so that the melt is supercooled (about 928° C.). After an interval of approximately 10 seconds at this temperature the germanium seed crystal is pulled upwardly at a rate of 7 inches per minute. Two dendritic crystals were attached to the seed and each was of a thickness of 7 mils and was approximately 2 mm. in width. The grown dendritic crystals had substantially flat and highly parallel faces from end to end with 111 orientation. The germanium dendritic crystals so grown were found to have no surface imperfections except for a number of microscopic steps differing by about 50 angstroms, were of a quality suitable for semiconductor applications and had a resistivity of 2 ohm-cm.

*Example II*

A series of indium pellets were disposed at 40 mil intervals upon the upper surface of a 6-inch strip of the n-type germanium crystal of Example I. On the opposite surface were disposed pellets of tin to provide an ohmic connection with each p-n junction.

The assembly was placed in a fusion furnace. The furnace was evacuated to approximately $10^{-3}$ mm. Hg and then heated to a temperature of approximately 500° C. whereby the indium melted and dissolved some of the germanium. The assembly was then allowed to cool whereby the germanium with some indium dissolved therein resolidified forming a p-n junction within the germanium crystal. Simultaneously the tin metal alloyed to the opposite surface to form the ohmic connection. Contact wires comprised of gold-coated nickel were disposed in the indium and in the tin as a second operation at 250° C. Subsequent to the attachment of the contact wires to the indium and tin regions, the entire strip was subjected for 10 sec. to a chemical post-etch consisting of 3 parts of 48% hydrofluoric acid, 1 part of concentrated nitric acid, and 1 part of glacial acetic acid. Following the chemical etch, the germanium strip containing the plurality of diodes with the contact wires was rinsed well in pure water and dried in a dry air atmosphere at 120° C. for 1 hour.

After the drying operation the Ge surface mid-way between the indium alloy dots was scribed with a diamond point. The semiconductor diodes were then broken from the end of the strip one by one. The contact wires of the individual diodes were then spot welded to the lead-in wires of a commercial plug-type header, following which operation a cap was hermetically sealed over the whole diode assembly.

While this invention has been described primarily in terms of germanium, it will be understood that its teachings are equally applicable to silicon and compounds of group III—V and II—VI of the periodic table.

It should be further understood that while the teachings of this invention have been described in terms of preparing p-n and p-n-p devices, the invention is equally applicable to preparing P-I-N, P-N-I-P and N-P-I-N devices.

While the invention has been described with reference to particular embodiments and examples, it will be under stood that modifications, substitutions and the like may be made therein without departing from its scope.

We claim as our invention:

1. In the method of continuously preparing semiconductor devices from a dendritic crystal of a semiconductor material in the form of an elongated strip having an indefinite length, said strip having a first-type of semiconductivity, said strip having a top and a bottom surface of 111 orientation, the steps comprising (1) serially subjecting successive portions of the elongated strip to a doping impurity capable of imparting a second type of semiconductivity into the strip to a predetermined depth through the top surface of 111 orientation, (2) serially applying ohmic contacts at predetermined intervals to each successive portion of the 111 orientated doped top surface of the dendritic strip while the still undoped portion of the strip is concurrently being doped, (3) serially applying ohmic contacts to the bottom 111 orientated surface of the strip along its entire length, and (4) thereafter severing the dendritic strip of indefinite length at points intermediate the predetermined intervals to produce a plurality of semiconductor devices.

2. In a method of continuously preparing semiconductor devices from a dendritic crystal of a semiconductor material in the form of an elongated strip having an indefinite length, said strip having a first-type of semiconductivity, said strip having a top and a bottom surface of 111 orientation, the steps comprising doping by vapor diffusion, the top 111 oriented surface on successive portions of the elongated dendritic strip with an impurity capable of imparting a second type of semiconductivity to a portion thereof, affixing ohmic contacts at predetermined intervals along the bottom 111 oriented surface on the successive portions of the elongated strip after vapor diffusion doping of the top surface while continuing to vapor diffuse the impurity into the next successive portion of the strip, then affixing an ohmic contact to the entire length of each successive portion of the vapor diffused surface of the strip, removing a portion of the ohmic contact and area of second type semiconductivity from the diffused surface at points intermediate to the predetermined intervals at which the ohmic contacts are disposed along the bottom 111 oriented surface, and thereafter severing the strip at substantially the points at which the ohmic contact and area of second type semiconductivity have been removed to produce a plurality of semiconductor devices.

3. In the method of continuously preparing semiconductor devices from a dendritic crystal of a semiconductor material in the form of an elongated strip having an indefinite length, said strip having a first-type of semiconductivity, said strip having a top and a bottom surface of 111 orientation, the steps comprising, (1) pulling the dendritic crystal from a supercooled melt, (2) serially subjecting successive portions of the continually growing dendrite, without any pretreatment of the 111 oriented surfaces, to a doping impurity, said doping impurity forming at least one region of a second-type of semiconductivity of a predetermined depth in the elongated strip, the total depth of the said at least one region of second-type semiconductivity formed by the doping impurity being less than the thickness of the grown strip, said doping impurity passing into the strip through at least one of the surfaces of 111 orientation of the grown crystal, (3) serially applying ohmic contacts to the 111 oriented surfaces, while continuing to grow and dope successive portions of the crystal and (4) thereafter severing the dendritic strip at predetermined points along the continually growing strip to produce a plurality of semiconductor devices.

4. In the method of continuously preparing semiconductor devices from a dendritic crystal of a semiconductor material in the form of an elongated strip having an indefinite length, said strip having a first-type of semiconductivity, said strip having a top and a bottom surface of 111 orientation, the steps comprising, (1) pulling the dendritic crystal from a supercooled melt, (2) doping successive grown portions of the continually growing dendrite by vapor diffusion, the dopant vapor contacting at least one of the 111 oriented surfaces of the grown dendritic strip, said 111 surfaces not having been pretreated before being contacted by the dopant vapor, said dopant vapor forming at least one region of a second-type of semiconductivity of a predetermined depth in the elongated strip, the total depth of the said at least one region of second-type semiconductivity formed by the dopant being less than the thickness of the grown strip, (3) serially applying ohmic contacts to the 111 oriented surfaces, while continuing to grow and dope successive portions of the crystal, and (4) thereafter severing the dendritic strip at predetermined points along the strip to produce a plurality of semiconductor devices.

5. In the method of continuously preparing semiconductor devices from a dendritic crystal of a semiconductor material in the form of an elongated strip having an indefinite length, said strip having a first-type of semiconductivity, said strip having a top and a bottom surface of 111 orientation, the steps comprising, (1) pulling the dendritic crystal from a supercooled melt, (2) serially disposing a plurality of doping pellets at predetermined intervals along at least one of the 111 oriented surfaces of the grown strip, said 111 oriented surfaces not having been pretreated before the disposal of the pellets thereon, said doping pellets forming at least one region of a second-type of semiconductivity of a predetermined depth in the elongated strip, the total depth of the said at least one region of second-type semiconductivity formed by the doping being less than the thickness of the grown strip, (3) affixing ohmic contacts at predetermined intervals along the length of the 111 oriented surfaces, while continuing to grow and dope successive portions of the crystal, (4) fusing said doping pellets and said ohmic contacts to the strip, and (5) thereafter severing the dendritic strip at points along the length of the strip to produce a plurality of semiconductor devices.

6. In the method of continuously preparing semiconductor devices from a dendritic crystal of a semiconductor material in the form of an elongated strip having an indefinite length, said strip having a first-type of semiconductivity, said strip having a top and bottom surface of 111 orientation, the steps comprising, (1) pulling the dendritic crystal from a supercooled melt, (2) serially subjecting successive portions of the continually growing dendrite, without any pretreatment of the 111 oriented surfaces, to a doping impurity, said doping impurity forming at least one region of a second-type of semiconductivity of a predetermined depth in the elongated strip, the total depth of the said at least one region of second-type semiconductivity formed by the doping impurity being less than the thickness of the grown strip, said doping impurity passing into the strip through at least one of the surfaces of 111 orientation of the grown crystal, (3)

serially applying ohmic contacts to the 111 oriented surfaces, while continuing to grow and dope successive portions of the crystal, (4) thereafter severing the dendritic strip at predetermined points along the continually growing strip to produce a plurality of semiconductor devices at least two of the aforesaid steps being carried out concurrently on different portions of the strip.

References Cited in the file of this patent

UNITED STATES PATENTS

| | | |
|---|---|---|
| 2,748,041 | Leverenz | May 29, 1956 |
| 2,788,432 | Moles | Apr. 9, 1957 |
| 2,841,860 | Kowry | July 8, 1958 |
| 2,846,626 | Nowak | Aug. 5, 1958 |
| 2,878,432 | Armstrong et al. | Mar. 17, 1959 |